United States Patent [19]
Kaneko et al.

[11] Patent Number: 5,752,040
[45] Date of Patent: May 12, 1998

[54] IMAGE PROCESSING APPARATUS WHICH CAN UPDATE PROGRAM

[75] Inventors: Satoshi Kaneko; Hideki Adachi; Shinichi Nakamura, all of Kawasaki; Naoyuki Ohki; Tokuharu Kaneko, both of Yokohama; Satoshi Kuroyanagi; Hiroshi Ozaki, both of Tokyo; Hisatsugu Tahara, Kawasaki; Taisei Fukada, Tokyo; Yukimasa Iseki, Kawasaki; Mitsuhiko Sato, Machida; Mitsuharu Takizawa, Fuchu, all of Japan

[73] Assignee: Canon Kabushiki Kaisha, Tokyo, Japan

[21] Appl. No.: 400,112

[22] Filed: Mar. 6, 1995

Related U.S. Application Data

[63] Continuation of Ser. No. 953,024, Sep. 29, 1992, abandoned.

[30] Foreign Application Priority Data

Sep. 30, 1991 [JP] Japan .................... 3-276109

[51] Int. Cl.⁶ .................... G06F 9/44; G06F 9/445; G06F 19/00
[52] U.S. Cl. .................... 395/712; 399/77; 399/83
[58] Field of Search .................... 395/162–166, 395/700, 501, 507, 712; 358/296, 443, 444, 448; 355/203, 204, 209, 314; 360/99.02, 99.06; 345/203, 201

[56] References Cited

U.S. PATENT DOCUMENTS

| | | | |
|---|---|---|---|
| 4,711,560 | 12/1987 | Hasaka et al. | 355/200 |
| 4,719,516 | 1/1988 | Nagashima | 358/444 |
| 4,742,483 | 5/1988 | Morrell | 364/DIG. 2 |
| 5,075,841 | 12/1991 | Kaneko | 364/DIG. 1 |
| 5,093,915 | 3/1992 | Platteter et al. | 395/700 |
| 5,115,273 | 5/1992 | Ujiie et al. | 355/209 |
| 5,210,854 | 5/1993 | Beaverton et al. | 364/DIG. 1 |
| 5,255,364 | 10/1993 | Hirose | 395/164 |

OTHER PUBLICATIONS

Research Disclosure Mar. 1991 pp. 201–203 "Reproduction Apparatus Providing User Manual and Other Documentation". WordPerfect Version 5.1, 1990, pp. 18–19.
The Concise Guide to MS–DOS Operating System Version 5.0, Microsoft, 1991, pp. 4, 6, 11–14, 21–22.

*Primary Examiner*—Dennis M. Butler
*Assistant Examiner*—Kakali Chaki
*Attorney, Agent, or Firm*—Fitzpatrick, Cella, Harper & Scinto

[57] ABSTRACT

An image processing apparatus comprises: an inserting unit to insert a memory medium such as IC card or floppy disc which can be freely attached or detached and in which programs to control the image processing apparatus have been stored; a memory to store the program which has been read out from the memory medium and kind data indicative of the kind of program; a loading circuit to load the program stored in the memory medium into the memory; and a control unit to control the image processing apparatus in accordance with the program stored in the memory. In the case where the program has already been stored in the memory, the control unit controls the loading circuit in a manner such that when the kind data stored in the memory is the data indicative of a special program, the loading of the program from the memory medium to the memory is inhibited and, when the kind data stored in the memory is not the data indicative of the special program, the loading of the program from the memory medium to the memory is executed.

8 Claims, 6 Drawing Sheets

IMAGE PROCESSING APPARATUS WHICH CAN UPDATE PROGRAM

This application is a continuation of application Ser. No. 07/953,024 filed Sep. 29, 1992, now abandoned.

BACKGROUND OF THE INVENTION

1. Field of the Invention

The invention relates to a method of changing a program which is executed in an image processing apparatus.

2. Related Background Art

Hitherto, in a copy device which can execute the copying operation on the basis of data that is supplied from an external device through an external interface, for instance, when a power supply is turned on, the transmission of various data is started by communicating with the external device every turn-on of the power source.

On the other hand, to execute various operations, it is desired to transmit a program in addition to the data and to execute the operation on the basis of the program. There is, however, an inconvenience such that since the program and data are also transmitted even when they are not necessary, a transmitting time extremely increases and the ordinary copying operation enters a waiting state, so that the reliability of the copy device is remarkably deteriorated.

There is also a serious problem such that in the case where the program and data are damaged during the period of time of the turn-on of the power supply, the copying operation cannot be performed and the reliability of the copy device is remarkably deteriorated, or the like.

There is also an inconvenience such that in the case where the program of the copy device can be changed from the outside, even when a special program has already been stored, it is erroneously erased.

SUMMARY OF THE INVENTION

It is an object of the invention to provide an image processing apparatus which can solve the above problems and also to provide a method of changing a program of the image forming apparatus.

Another object of the invention is to provide an image processing apparatus which can detect a version of a program and can prevent that the program is unexpectedly updated.

Still another object of the invention is to provide an image processing apparatus which can prevent a vain transmission of a program by controlling the transmission of the program in accordance with a change in state of an external device.

The above and other objects and features of the present invention will become apparent from the following detailed description and the appended claims with reference to the accompanying drawings.

DETAILED DESCRIPTION OF THE PREFERRED EMBODIMENTS

Figure 1:
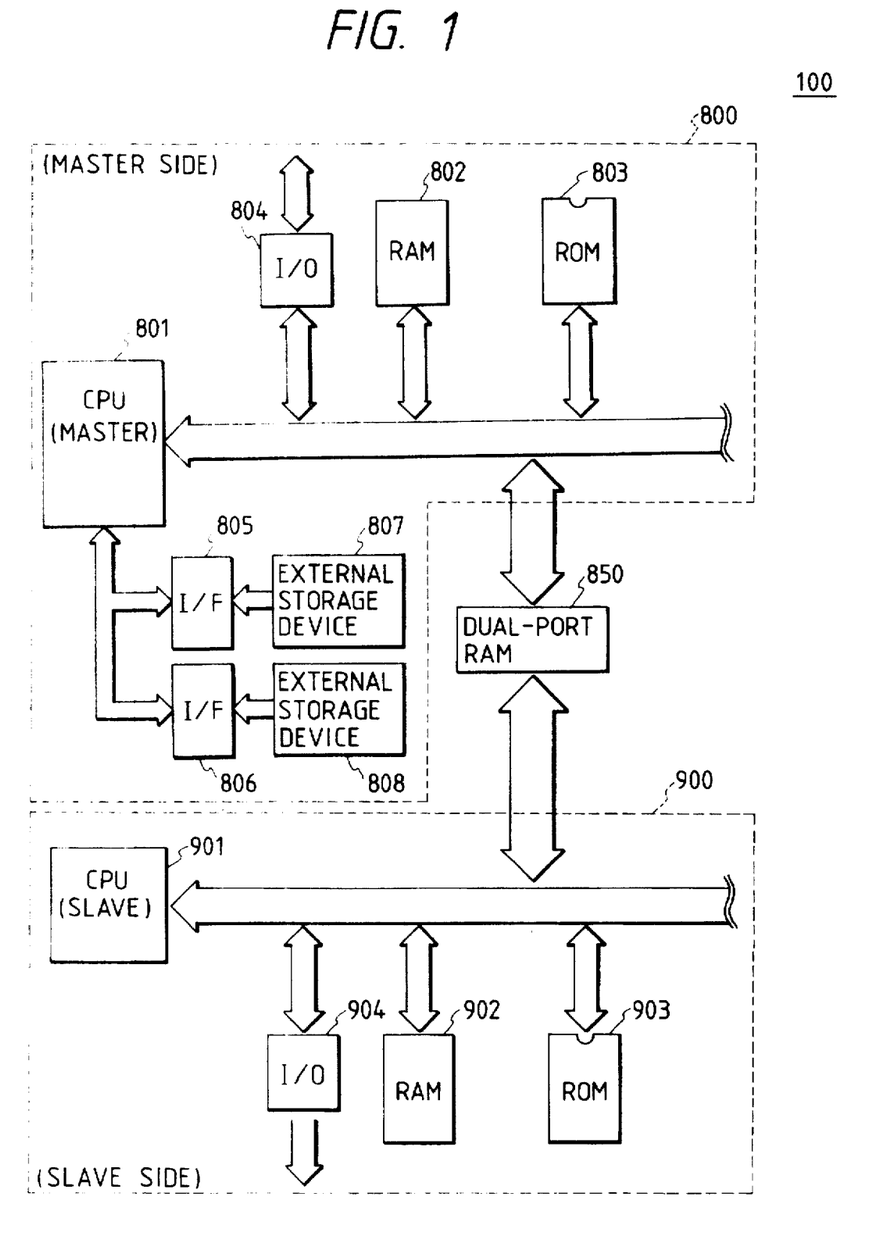
FIG. 1 is a block diagram for explaining a construction of a copy device showing an embodiment of the invention.

FIG. 1 is a block diagram for explaining a construction of a copy device showing an embodiment of the invention.

In the diagram, reference numeral 800 denotes a control unit of a copy device main body 100 (which will be explained hereinlater) and 900 indicates a control unit of an operation panel 600 (which will be explained hereinlater).

In the control unit 800, reference numeral 801 denotes a CPU to control the whole copy device and 901 indicates a CPU to control display means (LCD) 701 (which will be explained hereinlater) and LEDs to display various kinds of modes and the like which are arranged on the operation panel 600. The CPUs 801 and 901 are connected to the respective component elements in the control unit through bus lines. Reference numerals 803 and 903 indicate read only memories (ROMs) in which control procedures which are executed by the CPUs 801 and 901 have been stored upon activation of the copy device main body 100. Reference numeral 802 denotes a random access memory (RAM) in which the control procedures of the copy device main body 100 have been stored. The RAM 802 is backed up by a battery or the like. Even when a power supply of the copy device is turned off, the memory contents in the RAM 802 are held. In accordance with the control procedures stored in the RAM 802, the CPU 801 controls the accessing operations to the RAM 802, the ROM 803, an input/output (I/O) port 804, and interfaces 805 and 806 which are connected through a bus. Reference numeral 902 denotes a random access memory (RAM) to store control procedures of display means (LCD) 701 and LEDs to display various kinds of modes and the like. In accordance with the control procedures stored in the RAM 902, the CPU 901 controls the accessing operations to the RAM 902, the ROM 903, an input/output (I/O) port 904, a dual-port RAM 850, and the like which are connected through a bus. The I/O port 804 generates a control signal of the CPU 801 to each load such as a main motor 113 or the like, which will be explained hereinlater, of the copy device. The I/O port 804 also receives state signals from sensors or the like arranged at a plurality of positions of the copy device main body 100 and transmits to the CPU 801. On the other hand, the I/O port 904 functions as a port to generate control data from the CPU 901 to the display means (LCD) 701 to display a message and the LED to display various kinds of modes and the like which are arranged on the operation panel 600. The dual-port RAM 850 is connected to the CPUs 801 and 901 via the buses. The dual-port RAM 850 is used for communication between the CPUs 801 and 901. The interfaces 805 and 806 are used for the CPU 801 to read out the memory contents from external storage devices 807 and 808 which function as external devices.

In the embodiment, an IC card and a floppy disc are used as external storage devices 807 and 808. However, the interfaces 805 and 806 are constructed so that they can be also connected to the other kinds of external storage devices. Further, although the number of interfaces has been set to two in the embodiment, it is also obviously possible to cope with (expansion or deletion) various cases by properly increasing or decreasing the number of interfaces in accordance with the number of external storage devices.

In the copy device with the above construction, when the data or predetermined program stored in the external storage device 807 is transmitted to the RAM 802 by the CPU 801 or the like, the copy device main body 100 forms an image onto a recording medium on the basis of the data or predetermined program transmitted and stored in the RAM 802. In this instance, when the changes in accessing states to the external storage devices 807 and 808 are detected by the CPU 801, the CPU 801 controls the start and execution of the transmission on the basis of the result of the detection, thereby enabling the transmission timing to be managed.

Only when the CPU 801 detects the changes in the accessing states from the connection or disconnection of the external storage devices 807 and 808, the transmission of the data or predetermined program can be started.

Further, only when the CPU 801 detects the changes in the accessing states from the presence or absence of the data transmission from the external device to the external storage devices 807 and 808, the transmission of the data or predetermined program can be started.

On the other hand, only when the CPU 801 detects the changes in the accessing states from the coincidence state of the contents which are stored in the external storage devices 807 and 808 and RAM 802, the transmission of the data or predetermined program can be started.

Figure 2:
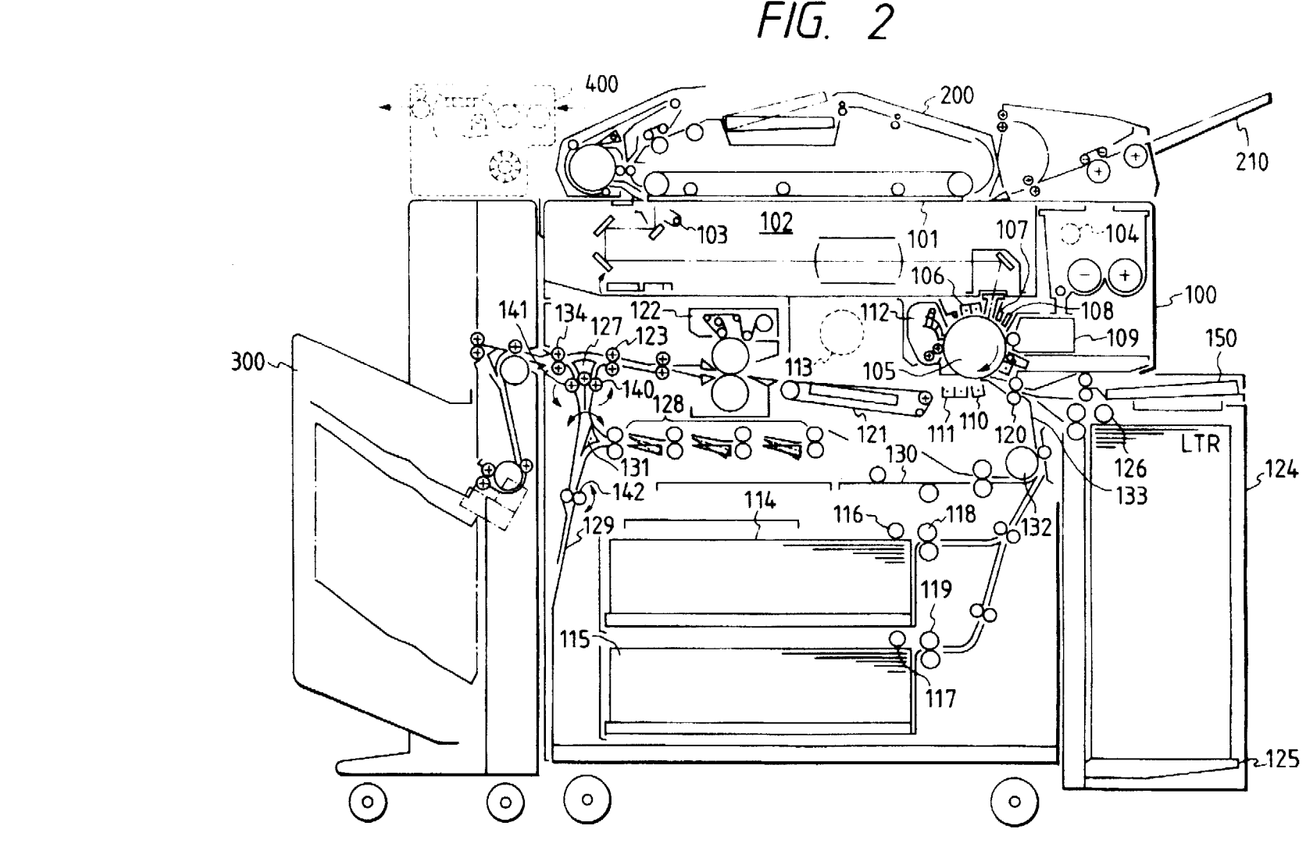
FIG. 2 is a cross sectional view showing a hardware construction of the copy device main body shown in FIG. 1.

FIG. 2 is a cross sectional view showing a construction of the copy device main body 100 shown in FIG. 1.

In the diagram, reference numeral 200 denotes a recyclic automatic document feeder (RDF) to automatically feed an original; 300 a sorter to sort the papers in which the copying processes have already been finished; and 400 an automatic computer form feeder (CFF). A system can be constructed by freely combining the RDF 200, sorter 300, and CFF 400 to the copy device main body 100.

In the copy device main body 100, reference numeral 101 denotes an original base glass as an original placing plate and 102 indicates an optical system comprising an original illuminating lamp (exposing lamp) 103, a scanning mirror, a lens, a motor 104, and the like. While scanning by the motor 104, the original is illuminated by the exposing lamp 103. The reflected light from the original is projected onto a photo sensitive drum 105 by the scanning mirror and the lens.

A high voltage unit 106, a blank exposing unit 107, a potential sensor 108, a developing device 109, a copy transfer charging device 110, a separation charging device 111, a cleaning device 112, and the like are provided around the photo sensitive drum 105. Image recording means is constructed by those component elements.

The photo sensitive drum 105 is rotated by the main motor 113 in the direction indicated by an arrow shown in FIG. 2.

The surface of the drum 105 has been corona-charged by the high voltage unit 106. When the reflected light from the original is illuminated from the optical system 102 to the drum, an electrostatic latent image is formed. The latent image is developed by the developing device 109 and is visualized as a toner image. On the other hand, the copy transfer paper which has been fed into the copy device main body 100 from an upper cassette 114 or a lower cassette 115 through a pickup roller 116 or 117 by a feed roller 118 or 119 is fed to the drum 105 after the timing was adjusted by a resist roller 120 so that the front edge of the toner image coincides with the front edge of the copy transfer paper. The toner image is copy transferred onto the paper by the copy transfer charging device 110. After completion of the copy transfer, the paper is separated from the drum 105 by the separation charging device 111 and is led to a fixing device 122 by a conveying belt 121 and the toner image is fixed by applying a pressure and heating. After that, the copy paper on which the image has been fixed is discharged to the outside of the copy device main body 100 by a discharge roller 123. The surface of the drum 105 is cleaned by the cleaning device 112.

A deck 124 on which, for example, 4000 copy transfer papers can be enclosed is installed in the copy device main body 100. A lifter 125 of the deck 124 is lifted up in accordance with a quantity of copy transfer papers so that the top one of the papers is always come into contact with a feed roller 126.

In FIG. 2, reference numeral 127 denotes a discharge flapper to switch a conveying path of a copy transfer paper to either one of the inside of the copy device main body 100 and the discharge side (sorter 300). Reference numeral 128 denotes a lower conveying path for turning back the copy transfer paper fed from the discharge roller 123 upside down through a reversing path 129 and for leading to a re-feed tray 130. Reference numeral 131 denotes a multiplexing flapper to switch a conveying path of the copy transfer paper in accordance with either one of the both-side recording mode and the multiplexing recording mode. By folding down the flapper 131 to the left, the copy transfer paper is directly led to the lower conveying path 128 without passing through the reversing path 129. Reference numeral 132 denotes a feed roller to feed the copy transfer paper to the drum 105 side via a path 133. Reference numeral 134 denotes a discharge roller, arranged near the discharge flapper 127, for discharging the copy transfer paper which has been switched to the discharge side by the discharge flapper 127 to the outside of the copy device main body.

In the both-side recording (both-side copying) mode or the multiplexing recording (multiplexing copying) mode, the flapper 127 is lifted up and the copied paper is enclosed onto the re-feed tray 130 through the paths 129 and 128 in a folding-back state. In the both-side recording mode, the multiplexing flapper 131 is folded down to the right. In the multiplexing recording mode, the flapper 131 is folded down to the left. In the back-side recording mode or the multiplexing recording mode which will be subsequently executed, the copy transfer papers enclosed on the re-feed tray 130 are led to the resist roller 120 of the copy device main body 100 one by one from the bottom through the path 133 by the feed roller 132.

When the copy transfer paper is reversed and discharged from the copy device main body 100, the discharge flapper 127 is lifted up, the multiplexing flapper 131 is folded down to the right, and the copied paper is conveyed to the reversing path 129 side. After the rear edge of the paper passed through a first feed roller 140, the paper is conveyed to a second feed roller 141 side by a reversing roller 142. The paper is turned back upside down by the discharge roller 134 and is discharged to the outside of the copy device main body. Reference numeral 150 denotes a multiplexing hand-inserting tray and 210 indicates a reservation tray.

The document feeding means is constructed by the RDF 200 and comprises a plurality of feeding means. Each feeding means is driven by executing an RDF control program stored in the ROM 802 by the CPUs 801 and 901.

In accordance with the copying mode which is set, the CPUs 801 and 901 select either one of the first feeding mode (forward feed) to feed the originals onto a mounting tray from a bundle of originals on the mounting tray without reversing the originals and the second feeding mode (reverse feed) to reverse and feed them and control each of the feeding means. For instance, in case of copying in the mode to obtain a both-side copy from a both-side original or the mode to obtain a one-side copy from each of the front and back surfaces of a both-side original, the feeding means is controlled so as to feed the originals onto the mounting tray from the bundle of originals put on the mounting tray in the first feeding mode (forward feed). In the mode to obtain a copy of the back surface of the original, the feeding means is controlled so as to convey the original from the mounting tray to the original base glass 101 in the first feeding mode (forward feed).

Figure 3:
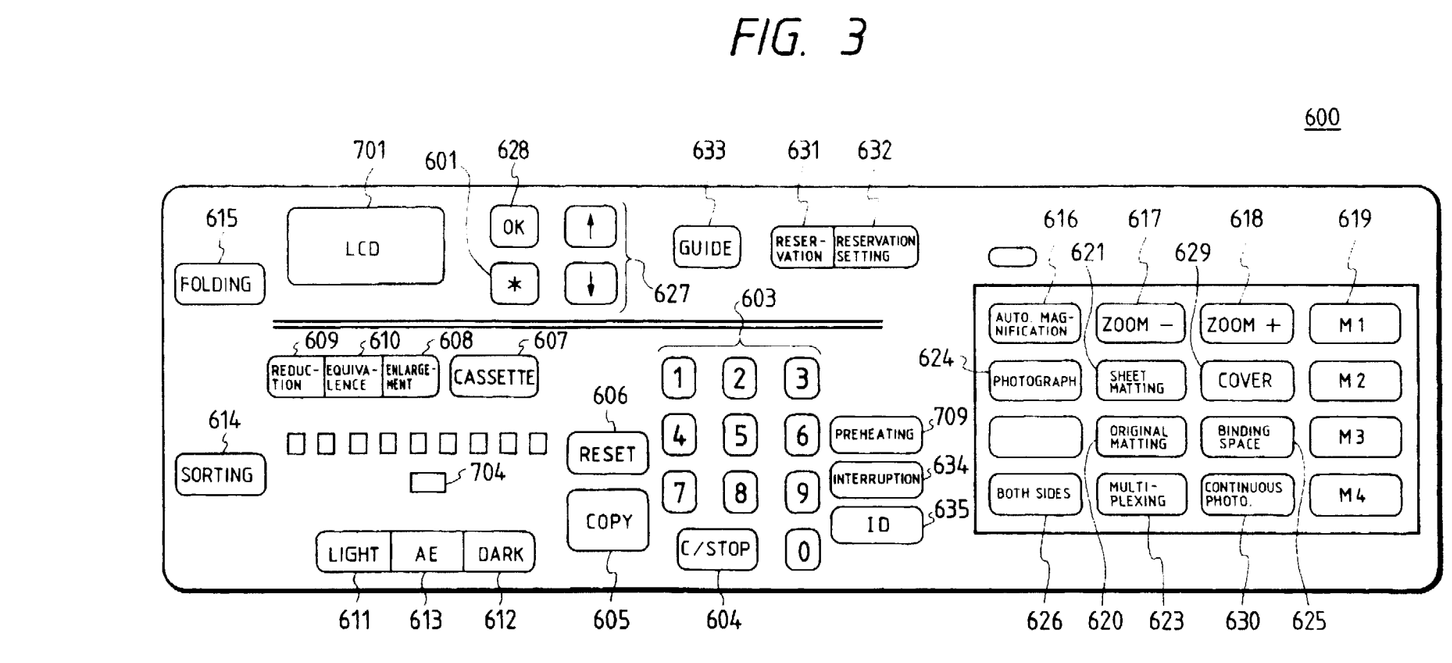
FIG. 3 is a plan view for explaining a construction of an operating section which is arranged on an upper surface of the copy device main body shown in FIG. 1.

FIG. 3 is a plan view for explaining a construction of the operating section 600 which is provided on the upper surface of the copy device main body 100 shown in FIG. 1.

In the diagram, reference numeral 601 denotes an asterisk key which is used in the setting mode when the operator (user) sets an amount of binding space, a size of original matting, or the like; 627 a cursor key which is used in the setting mode when the operator selects a set item; 628 an OK key which is used in the setting mode when the operator determines the set contents; and 606 an all reset key which is depressed to return the operating mode to the standard mode. The all reset key 606 is also depressed to return the operating mode from the automatic shut-off mode to the standard mode. Reference numeral 604 indicates a clear/stop key which funtions as a clear key in the standby mode and as a stop key during the copy recording operation. The clear/stop key 604 is also used to cancel the set number of copy papers. The clear/stop key 604 is also depressed to interrupt the continuous copying mode. After completion of the copying operation at a time point of the depression of the clear/stop key 604, the copying operation is stopped. Reference numeral 605 denotes a copy start key.

Reference numeral 603 denotes a ten-key which is depressed to set the number of copy papers and is also depressed to set the asterisk (*) mode. Reference numeral 619 denotes a memory key by which the modes which are frequently used by the user can be registered. In this instance, four kinds of modes $M_1$ to $M_4$ can be registered. Reference numerals 611 and 612 denote copy density keys which are depressed to manually adjust a copy density; 613 an AE key which is used when the copy density is automatically adjusted in accordance with a density of original or when the AE (automatic density adjustment) is cancelled and copy density is manually adjusted; and 607 a copy sheet selection key which is depressed to select either one of the upper cassette 114, lower cassette 115, deck 124, and multiplexing hand-inserting tray 150. When the copy sheet selection key 607 is depressed in a state in which originals are put on the RDF 200, an automatic paper cassette selecting (APS) mode is selected, so that the cassette of the same size as that of the original is automatically selected. Reference numeral 610 denotes an equivalent magnification key which is depressed to obtain a copy of the equal magnification (original size); 616 an automatic magnification key which is depressed to automatically designate the reduction or enlargement of the image of the original in accordance with the size of the copy transfer paper designated; 626 a both-side key which is depressed to obtain a both-side copy from a one-side original, a both-side copy from a both-side original, or a one-side copy from a both-side original; 625 a binding space key by which a binding space of the designated length can be formed to the left side of the copy transfer paper; 624 a photograph key which is depressed to copy a photograph original; 623 a multiplexing key which is depressed to form (synthesize) an image onto the same side of the copy transfer paper from two originals; and 620 an original matting key which is depressed when the user performs a matting process of an original of the fixed size. In this instance, the size of original is set by the asterisk key 601. Reference numeral 621 denotes a sheet matting key which is depressed to perform the matting process to the original in accordance with the size of copy paper. Reference numerals 617 and 618 denote zoom keys.

Reference numeral 629 denotes a cover mode setting key which is used when a front cover or a back cover is formed or a binding paper is inserted; 630 a continuous page copy key which is used when the left and right pages of a double-spread book are continuously copied; and 614 a discharging method selection key to select either one of the discharging methods such as staple sorting method, sorting method, and group method. In the case where a staple sorter is connected, the copy papers after completion of the recording can be discharged and sorted in either one of the stable sorting mode, sorting mode, and group mode selected by the key 614. The selected mode can be also cancelled by the key 614. Reference numeral 631 denotes a reservation key which is used to start the setting of the copying mode to a reserved original put on the reservation tray 210 and to cancel the reservation set; 632 a reservation setting key which is used as a deciding key in the reserving mode which has been set; 633 a guide key which is used to display the descriptions of the functions corresponding to various kinds of keys onto a message display. Reference numeral 701 denotes the message display of the LCD (liquid crystal display) type to display the information regarding the copy. The message display 701 displays characters or a figure by (96×192) dots. For instance, the message display 701 displays the number of copy papers which has been set by the ten-key 603, the copy magnification which has been set by fixed manification keys 608 and 609, an equivalence magnification key 610, or zoom keys 617 and 618, the paper size which has been selected by the copy sheet selection key 607, the message indicative of the state of the copy device main body 100, the guide message to indicate an operating procedure, and the set contents of the various kinds of modes, and the like. Reference numeral 704 denotes an AE display which is lit on when the AE (automatic density adjustment) mode is selected by the AE key 613.

Reference numeral 709 denotes a preheating display which is lit on in a preheating mode. When the RDF 200 is used in the standard mode, the number of copy papers is set to one, the density AE mode is set, the automatic sheet selecting mode is set, the equal magnification is set, and the copying mode to obtain a one-side copy from a one-side original is set. In the standard mode in a state in which the RDF 200 is not used, the number of copy papers is set to one, the density manual mode is set, the equal magnification is set, and the copying mode to obtain a one-side copy from a one-side original is set. Whether the RDF 200 is used or not is discriminated by checking whether the original has been put on the RDF 200 or not. Reference numeral 615 denotes a folding key, 634 an interruption key, and 635 an ID key.

Figure 4:
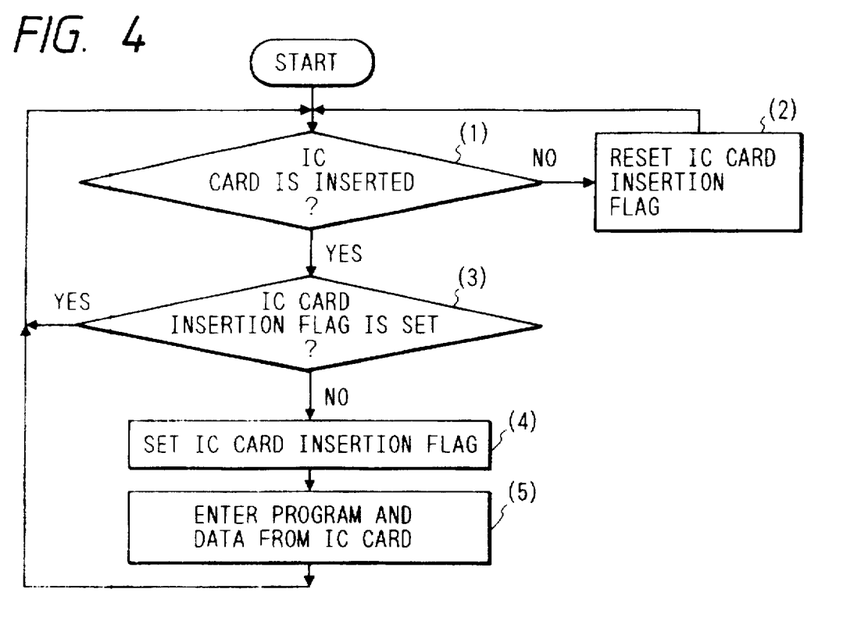
FIG. 4 is a flowchart showing an example of an access processing procedure of an external storage device of the first embodiment in the copy device according to the invention.

FIG. 4 is a flowchart showing an example of an access processing procedure of the external storage device in the first embodiment in the copy device according to the invention. Reference numerals (1) to (5) denote processing steps. FIG. 4 shows the case where the external storage device 807 in the embodiment is constructed by an IC card. First, a check is made to see if the IC card as an external storage device 807 has been inserted into a card inserting portion of the copy device or not (1). If NO, for instance, an IC card insertion flag which is set into a flag storage area that is held in the RAM 802 is reset (2). The processing routine is returned to step (1).

On the other hand, if YES in step (1), a check is made to see if the IC card insertion flag has been set or not (3). If YES in step (3), the processing routine is returned to step (1). If NO, the IC card insertion flag is set (4). The program and data are read out from the IC card as an external storage device 807 and the read-out program and data are stored into a data storage area in the RAM 802 through the interface 805 (5). After completion of the storing process, the processing routine is returned to step (1).

Figure 5:
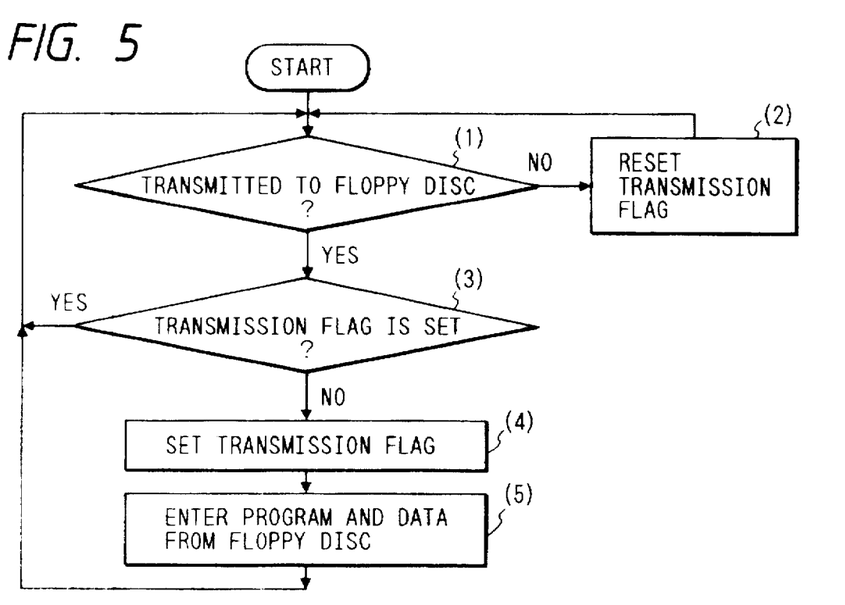
FIG. 5 is a flowchart showing an example of an access processing procedure of an external storage device of the second embodiment in the copy device according to the invention.

FIG. 5 is a flowchart showing an example of an access processing procedure of the external storage device in the second embodiment in the copy device according to the invention. Reference numerals (1) to (5) denote processing steps. In this instance, the external storage device 807 in the embodiment is constructed by a floppy disc and a communicating apparatus (for example, modem) (not shown) to communicate with a remote computer is connected to the floppy disc.

First, a check is made to see if a program and data of the copy device have been transmitted and stored from the communicating apparatus connected to the external storage device 807 or not (1). If NO, a transmission flag which is set into the flag storage area that is held in, for example, the RAM 802 is reset (2). The processing routine is returned to step (1).

On the other hand, if YES in step (1), a check is made to see if the transmission flag has been set or not (3). If YES in step (3), the processing routine is returned to step (1). If NO, the transmission flag is set (4). The program and data of the copy device are read out from the floppy disc as an external storage device 807 and are stored into the data storage area in the RAM 802 through the interface 805 (5). After completion of the storing process, the processing routing is returned to step (1).

Figure 6:
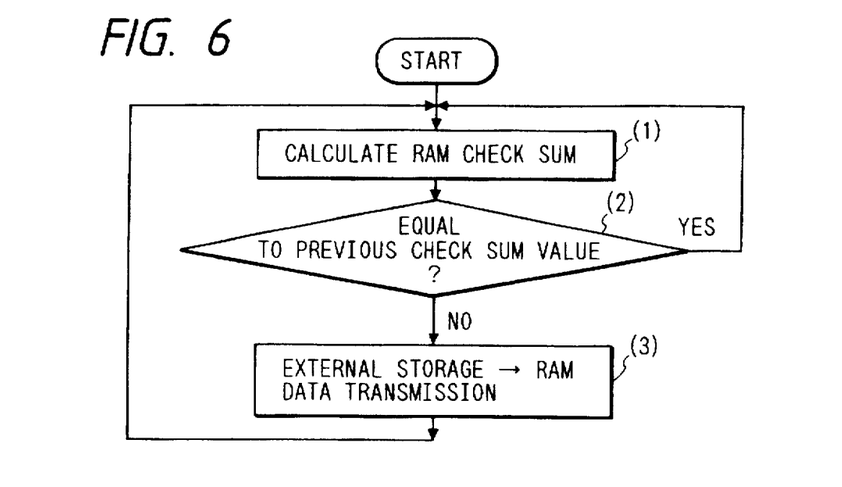
FIG. 6 is a flowchart showing an example of an access processing procedure of an external storage device of the third embodiment in the copy device according to the invention.

FIG. 6 is a flowchart showing an example of an access processing procedure of the external storage device in the third embodiment in the copy device according to the invention. Reference numerals (1) to (3) denote processing steps. In this instance, the external storage device 807 in the embodiment is constructed by an IC card or a floppy disc and a communicating apparatus (not shown) to communicate with a remote computer is connected to the floppy disc.

First, a check sum of the program and data of the copy device stored in the RAM 802 is calculated (1). A check is made to see if the calculated check sum coincides with the previous check sum value which has calculated and stored in the RAM 802 or not (2). If YES, the processing routine is returned to step (1). If NO, the program and data of the copy device are stored into the data storage area in the RAM 802 from the floppy disc as an external storage device 807 through the interface 805, or the program and data of the copy device are stored into the data storage area in the RAM 802 from the IC card as an external storage device 807 through the interface 805 (3). After that, the processing routine is returned to step (1). In this instance, the newly calculated check sum value is stored into the RAM 802 in place of the previous check sum value calculated.

Figure 7:
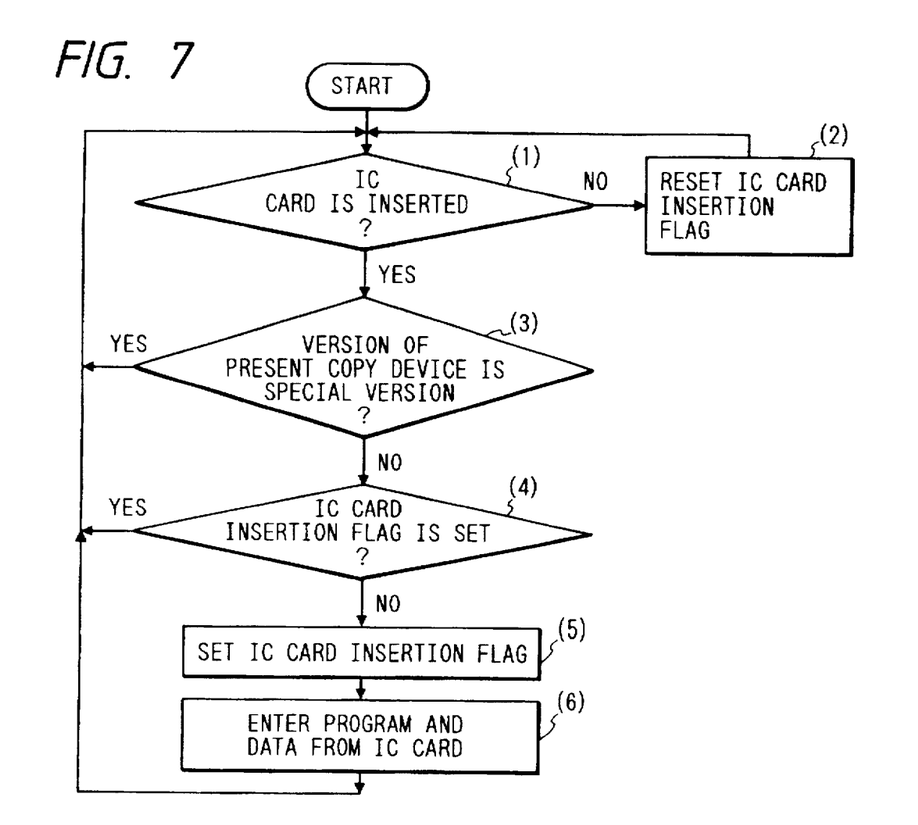
FIG. 7 is a flowchart showing an example of an access processing procedure of an external storage device of the fourth embodiment in the copy device according to the invention.

FIG. 7 is a flowchart showing an example of an access processing procedure of the external storage device in the fourth embodiment in the copy device according to the invention. Reference numerals (1) to (6) denote processing steps. FIG. 7 shows the case where the external storage device 807 the embodiment is constructed by an IC card. First, a check is made to see if the IC card as an external storage device 807 has been inserted into the card inserting portion of the copy device or not (1). If NO, the IC card insertion flag which is set into the flag storage area that is held in, for example, the RAM 802 is reset (2). The processing routine is returned to step (1).

If YES in step (1), a check is made to see if the version of the program stored in the present copy device is a special version or not (3). The discrimination of the special version program will now be described. When the program is transmitted from the external storage device to the RAM 802 in the copy device, the code data indicative of the kind of program is also transmitted and stored into the RAM 802. The code data includes data to indicate whether the program is the program for general users or the program for a special user or the program for a field test. When the code data stored in the RAM 802 is not the data indicative of the program for the general users, the CPU 801 determines that the version of the program stored at present is the special version. If YES in step (3), the processing routine is returned to step (1). If NO, a check is made to see if the IC card insertion flag has been set or not (4). If YES in step (4), the processing routine is returned to step (1). That is, the updating of the program is inhibited. If NO, the IC card insertion flag is set (5). The program and data of the copy device are read out from the IC card as an external storage device 807 and are stored into the data storage area in the RAM 802 through the interface 805 (6). After completion of the storing processing, the processing routine is returned to step (1).

Figure 8:
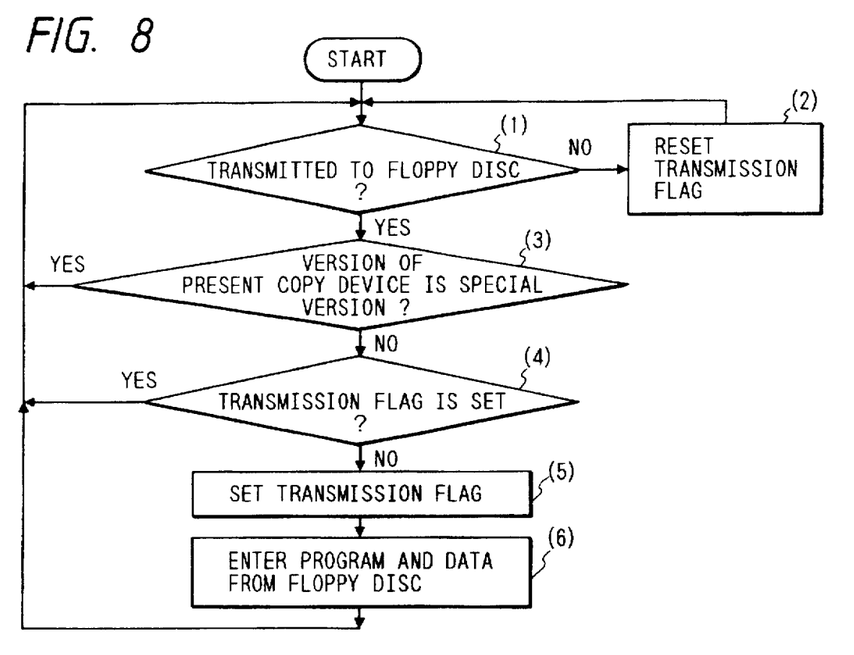
FIG. 8 is a flowchart showing an example of an access processing procedure of an external storage device of the fifth embodiment in the copy device according to the invention.

FIG. 8 is a flowchart showing an example of an access processing procedure of the external storage device in the fifth embodiment in the copy device according to the invention. Reference numerals (1) to (6) denote processing steps. The external storage device 807 in the embodiment is constructed by a floppy disc. A communicating apparatus (for example, modem) (not shown) to communicate with a remote computer is connected to the floppy disc.

First, a check is made to see if the program and data of the copy device have been transmitted from the communicating apparatus (not shown) to the floppy disc as an external storage device 807 or not (1). If NO, a transmission flag which is set into a flag storage area that is held in, for example, the RAM 802 is reset (2). The processing routine is returned to step (1).

If YES in step (1), a check is made to see if the version of the program of the present copy device is a special version or not in a manner similar to that mentioned above (3). If YES, the processing routine is returned to step (1). If NO, a check is made to see if the transmission flag has been set or not (4). If YES in step (4), the processing routine is returned to step (1). If NO, the transmission flag is set (5). The program and data of the copy device are read out from the floppy disc as an external storage device 807 and are stored into the data storage area in the RAM 802 through the interface 805 (6). After completion of the storing processing, the processing routine is returned to step (1).

Figure 9:
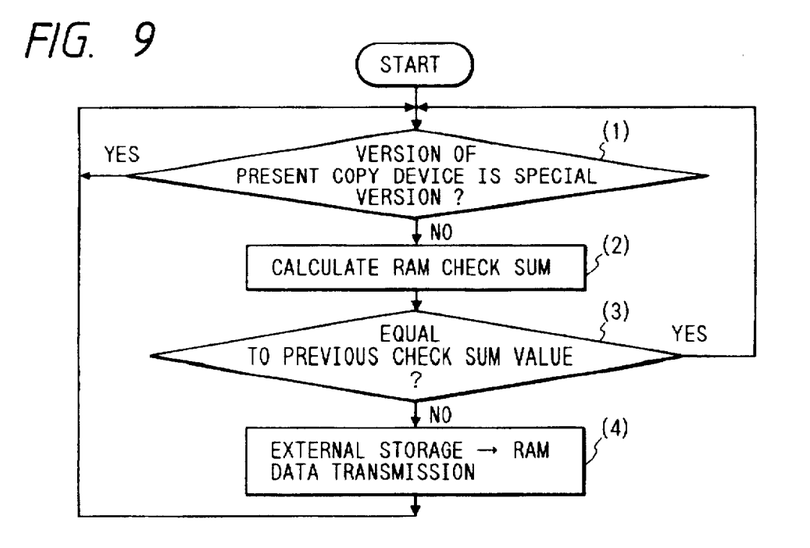
FIG. 9 is a flowchart showing an example of an access processing procedure of an external storage device of the sixth embodiment in the copy device according to the invention.

FIG. 9 is a flowchart showing an example of an external device access processing procedure in the sixth embodiment in the copy device according to the invention. Reference numerals (1) to (4) denote processing steps. The external storage device 807 in the embodiment is constructed by an IC card or a floppy disc. A communicating apparatus as mentioned above is connected to the floppy disc.

First, a check is made to see if the version of the program of the present copy device is a special version or not in a manner similar to that mentioned above (1). If YES, the discrimination in step (1) is repeated. If NO, a check sum of the program and data of the copy device stored in the RAM 802 is calculated (2). A check is made to see if the calculated check sum value coincides with the previous check sum value which had been calculated or not (3). If YES, the processing routine is returned to step (1). If NO, the program and data of the copy device are stored into the data storage area in the RAM 802 through the interface 805 from the floppy disc as an external storage device 807 or the program and data of the copy device are stored into the data storage area in the RAM 802 through the interface 805 from the IC card as an external storage device 807 (4). The processing routine is returned to step (1).

In the above fourth to sixth embodiments, when the version of the program stored in the copy device is the special version, it is possible to prevent that the program is unexpectedly rewritten. When the special version program has been rewritten, it is sufficient that a service mode for a service person is set and a command to erase the program is generated from the operating section of the copy device and a new program is supplied.

The present invention is not limited to the foregoing embodiments but many modifications and variations are possible within the spirit and scope of the appended claims of the invention.

What is claimed is:

1. An image forming apparatus comprising:

image forming means;

an inserting unit for inserting a storage medium which is freely attachable and detachable and in which programs to control said image forming means and version data indicating versions of the programs have been stored;

a memory to store the program and the version data which are read out from said storage medium;

loading means for loading the program and the version data stored in said storage medium into said memory; and control means for controlling said image forming means in accordance with the program stored in said memory, wherein said control means includes discrimination means for discriminating whether the program already stored in said memory is a special version program or not on the basis of the version data already stored in said memory, and wherein when a new program is loaded by said loading means, said control means controls said loading means in a manner such that when said discrimination means discriminates that the program already stored in said memory is the special version program, the loading of the new program from the storage medium to said memory by said loading means is inhibited so as not to rewrite the program already stored in said memory, and when said discrimination means discriminates that the program already stored in said memory is other than the special version program, the loading of the new program from the storage medium to said memory by said loading means is permitted so as to rewrite the program already stored in said memory, and wherein even if the program already stored in said memory is the special version program, said control means permits the loading of the new program when an instruction for erasing the special version program is input in a service mode for a serviceman.

2. An apparatus according to claim 1, wherein, when no program has been previously stored in said memory, said control means controls said loading means so as to execute the loading of the program from the storage medium to said memory.

3. An apparatus according to claim 1, wherein said control means discriminates the kind data stored in said memory when the storage medium is inserted into said inserting unit.

4. An image forming apparatus comprising:

image forming means;

communicating means for communicating with a remote computer;

a memory to store a program to control the image forming means and version data indicating a version of said program which are received from said communicating means; and control means for controlling the image forming means in accordance with the program stored in said memory, wherein said control means includes discrimination means for discriminating whether the program already stored in said memory is a special version program or not on the basis of the version data already stored in said memory, and wherein when a new program received by said communicating means is stored in said memory, said control means controls said memory means in a manner such that when said discrimination means discriminates that the program already stored in said memory is the special version program, the storing of the new program received by said communicating means to said memory is inhibited so as not to rewrite the program already stored in said memory, and when said discrimination means discriminates that the program already stored in said memory is other than the special version program, the storing of the new program received by said communicating means to said memory is permitted so as to rewrite the program already stored in said memory, and wherein even if the program already stored in said memory is the special version program, said control means permits the loading of the new program when an instruction for erasing the special version program is input in a service mode for a serviceman.

5. An apparatus according to claim 4, wherein said control means stores the program received by said communicating means into said memory when no program has been previously stored in said memory.

6. An apparatus according to claim 4, wherein said control means discriminates the kind data stored in said memory in response to a receiving of the program by said communicating means.

7. A renewing method for a program in an image forming apparatus that comprises an image forming means, comprising the steps of:

a) inserting a storage medium in which a program for controlling said image forming means and version data indicating a version of said program are stored, into an inserting unit;

b) discriminating whether a version of the program already stored in a memory of said image forming apparatus is a special version or not on the basis of the version data stored in said memory;

c) inhibiting rewriting the program already stored in said memory by the program stored in the storage medium inserted in the step a), when it is discriminated that the version of the program already stored in said memory is a special version in the step b, permitting rewriting the program already stored in said memory by the program stored in the storage medium inserted in the step a), when it is discriminated that the version of the program already stored in said memory is not the special version in the step b; and d) permitting the storing of the program stored in the storage medium into said memory when an erasing instruction of the program of the special version is input in a service mode even if it is discriminated that the program already stored in said memory is the program of the special version.

8. A renewing method of a program in an image forming apparatus that comprises an image forming means, comprising the steps of:

a) receiving a program for controlling the image forming means and version data indicating a version of said program, from a remote location;

b) discriminating whether a version of the program already stored in a memory of said image forming apparatus is a special version or not on the basis of version data stored in said memory;

c) inhibiting rewriting the program already stored in said memory by the program received in said step a), when it is discriminated that the version of the program already stored in said memory is the special version in the step b, permitting rewriting the program already stored in said memory by the program received in said step a), when it is discriminated that the version of the program already stored in said memory is not the special version in the step b, and d) permitting the storing of the program received in the said step a) into said memory when an erasing instruction of the program of the special version is input in a service mode even it is discriminated that the program already stored in said memory is the program of the special version.

\* \* \* \* \*

UNITED STATES PATENT AND TRADEMARK OFFICE
CERTIFICATE OF CORRECTION

PATENT NO. : 5,752,040

DATED : May 12, 1998

INVENTOR(S): SATOSHI KANEKO, ET AL.

It is certified that error appears in the above-identified patent and that said Letters Patent is hereby corrected as shown below:

COLUMN 3

Line 13, "(expansion or deletion) various cases" should read --various cases (expansion or deletion)--;
Line 57, "photo sensitive" should read --photosensitive--;
Line 64, "photo sensitive" should read --photosensitive--;
Line 66, "photo sensitive" should read --photosensitive--.

COLUMN 4

Line 67, "passed" should read --is passed--.

COLUMN 5

Line 41, "funtions" should read --functions--.

COLUMN 6

Line 19, "of original" should read --of an original--;
Line 49, "mauification" should read --magnification--.

COLUMN 7

Line 51, "routing" should read --routine--;
Line 64, "has" should read --has been--.

UNITED STATES PATENT AND TRADEMARK OFFICE
CERTIFICATE OF CORRECTION

PATENT NO. : 5,752,040

DATED : May 12, 1998

INVENTOR(S): SATOSHI KANEKO, ET AL.  Page 2 of 2

It is certified that error appears in the above-identified patent and that said Letters Patent is hereby corrected as shown below:

COLUMN 8

Line 13, "where the" should read --where in the--;
Line 14, "the embodiment is" should read --is the embodiment--.

COLUMN 9

Line 56, "wherein" should read --¶ wherein--.

COLUMN 12

Line 23, "even it" should read --even when it--.

Signed and Sealed this

Twenty-ninth Day of June, 1999

Attest:

Q. TODD DICKINSON

Attesting Officer    Acting Commissioner of Patents and Trademarks